United States Patent [19]

Faure et al.

[11] 3,837,146

[45] Sept. 24, 1974

[54] SEPARATING APPARATUS PARTICULARLY SUITABLE FOR GAS PERMEATION AND IN PERVAPORATION

[75] Inventors: Alphonse Faure; Bruno Jamet, both of Rhone, France

[73] Assignee: Rhone Poulenc S.A., Paris, France

[22] Filed: Sept. 7, 1972

[21] Appl. No.: 286,703

[30] Foreign Application Priority Data

Sept. 9, 1971 France .............................. 71.32585

[52] U.S. Cl. ................................................ 55/158
[51] Int. Cl. ............................................. B01d 53/22
[58] Field of Search ................................. 55/16, 158

[56] References Cited
UNITED STATES PATENTS

| | | | |
|---|---|---|---|
| 3,416,985 | 12/1968 | Dounoucos ............................. | 55/16 |
| 3,520,803 | 7/1970 | Iaconelli ................................. | 55/16 |
| 3,564,819 | 2/1971 | Neulander et al. ..................... | 55/158 |
| 3,611,676 | 10/1971 | Christen et al. ........................ | 55/16 |
| 3,624,983 | 3/1970 | Ward ...................................... | 55/16 |
| 3,661,721 | 5/1972 | Rodgers ................................. | 55/158 |
| 3,735,559 | 5/1973 | Salemme ................................ | 55/158 |
| 3,735,562 | 5/1973 | Mousseau .............................. | 55/158 |

Primary Examiner—Charles N. Hart
Attorney, Agent, or Firm—Stevens, Davis, Miller & Mosher

[57] ABSTRACT

Separating apparatus, particularly suitable for gas permeation and pervaporaton, such apparatus comprising a plurality of parallelopipedonal frame members having a central cell forming aperture stacked alternately with a plurality of parallelopipedonal membrane members of substantially the same outside dimensions, the membrane members each including two permeable membranes having a porous support interposed therebetween, at least one opening formed in the porous support near one side and extending across between 40 and 90% of the width of the support, with the two membranes secured to one another in a fluid tight manner over a zone within the opening or openings, at least one orifice being formed in the membranes in said zone or zones, the openings of alternate membrane members being on opposite sides of the stack; means for supplying fluid to one end of the stack; means for withdrawing fluid from the other end of the stack; a fluid tight chamber enclosing the stack and means for removing permeate from said chamber.

5 Claims, 10 Drawing Figures

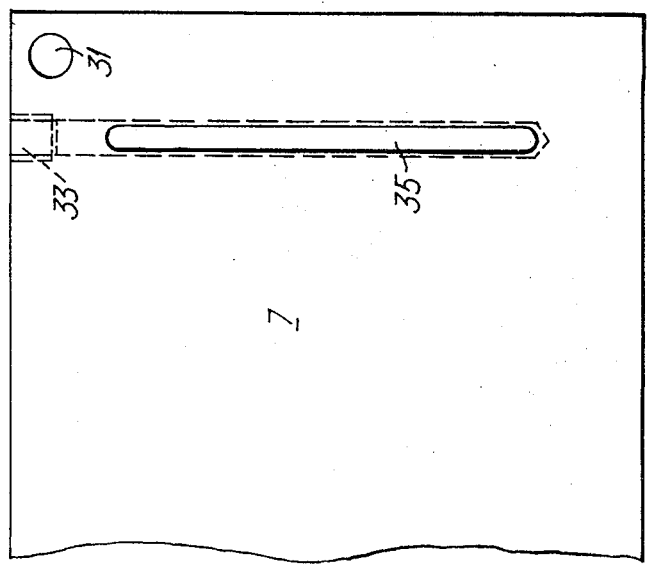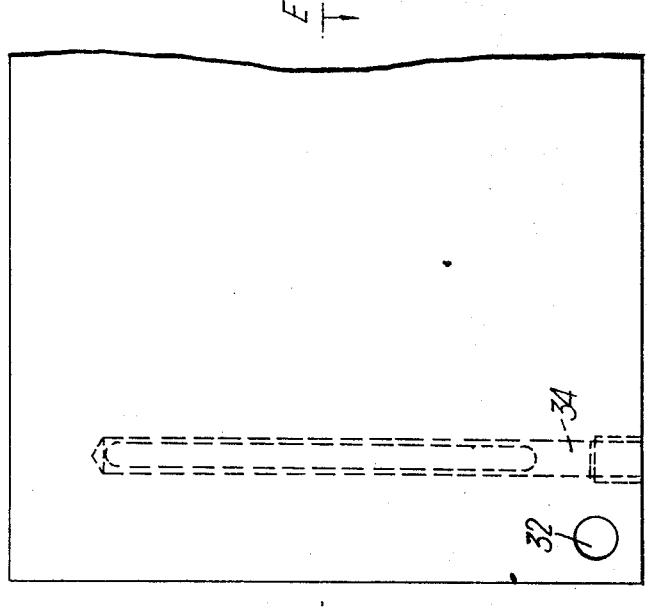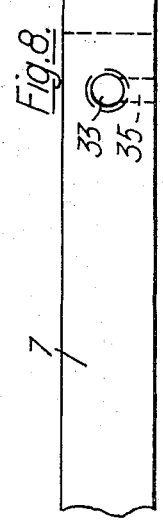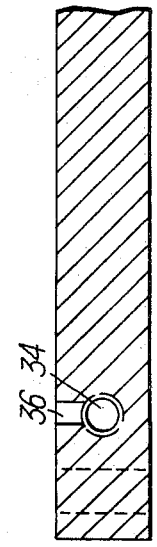

SEPARATING APPARATUS PARTICULARLY SUITABLE FOR GAS PERMEATION AND IN PERVAPORATION

The present invention relates to a separating apparatus with membranes, which can be used in gas permeation and in pervaporation.

These techniques are used in very varied fields, for example, in the chemical industry for recovering gas from purges, or for producing air enriched with oxygen from the atmosphere. Special apparatuses are required for carrying out these techniques.

Such apparatuses have already been described, for example, in U.S. Pat. No. 3,252,272. The apparatus described in this Specification consists of membranes which are wound up in spirals. Such an apparatus forms an assembly which cannot be taken apart, the fluidtightness of which is difficult to achieve and which can be rendered unusable by the presence of a single leak.

According to the present invention, we provide separating apparatus, particularly suitable for gas permeation and pervaporation, such apparatus comprising a plurality of parallelopipedonal frame members having a central cell forming aperture stacked alternately with a plurality of parallelopipedonal membrane members of substantially the same outside dimensions, the membrane members each including two permeable membranes having a porous support interposed therebetween, at least one opening formed in the porous support near one side and extending across between 40 and 90 percent of the width of the support, with the two membranes secured to one another in a fluid tight manner over a zone within the opening or openings, at least one orifice being formed in the membranes in said zone or zones, the openings of alternate membrane members being on opposite sides of the stack; means for supplying fluid to one end of the stack; means for withdrawing fluid from the other end of the stack; a fluid tight chamber enclosing the stack and means for removing permeate from said chamber.

The construction of such an apparatus is simple and can be rendered automatic. There can be a large surface area of membrane although the overall size is reduced, and the circuit of the permeate can be subjected to vacuum and a possible leak across the membrane can, if necessary, easily be located.

Preferably, the apparatus according to the invention contains, in addition, one or more intermediate plates having, on each of their opposite faces, an elongated port, the position of which corresponds to that of the orifices of the adjacent membrane member, the ports connecting with a pipeline opening on the side face of the plate, the pipelines being located in a symmetrical manner relative to the centre of the plate. Tubes allow these pipelines to be connected to suitable headers. The stack consisting of an end plate or an intermediate plate, a certain number of frame joints and membrane elements and an intermediate plate can then form a sub-assembly.

Preferably, the end plates and the intermediate plates are identical.

The present invention will be better understood from the following description, given only by way of example, reference being made to the accompanying drawings, in which:

FIG. 7 is an end elevation of an end plate or an intermediate plate;

FIG. 8 is a side view partly in cross-section taken along the line E—E of FIG. 7;

Figure 1:
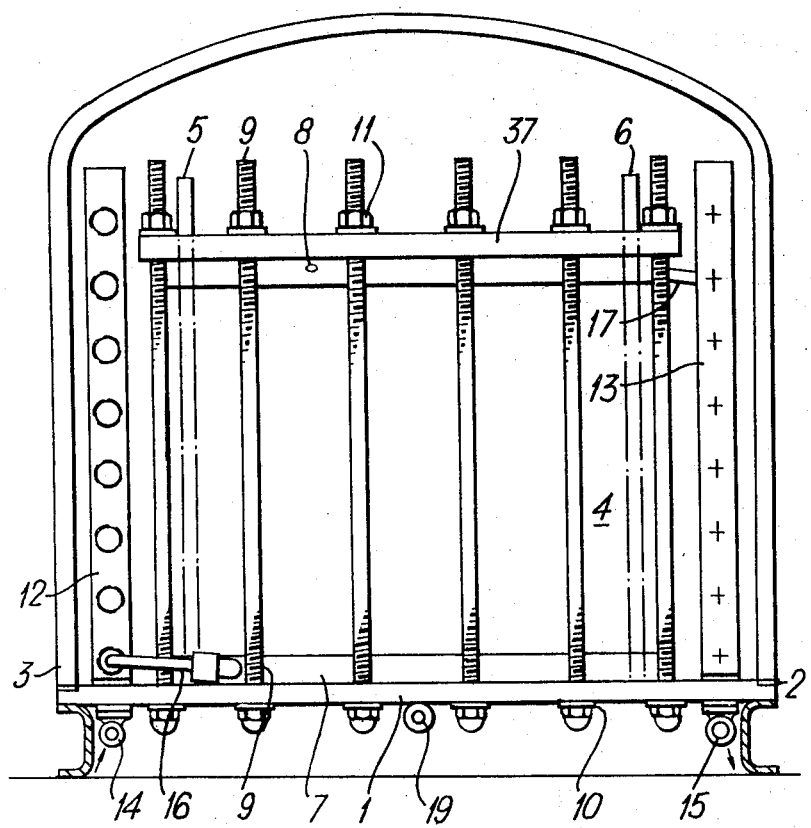
FIG. 1 is a side elevation of one embodiment of apparatus according to the invention.

The apparatus shown in the drawings can be used in gas permeation and pervaporation at pressures ranging preferably from 3 to 12 bars absolute. The apparatus comprises a closed chamber consisting of a rigid base plate 1 and a casing 3 which is supposed to be transparent for the convenience of the drawing. The base and the casing are assembled by fixing devices (not shown), fluidtightness being provided by a gasket 2. The base plate and the casing form a fluidtight chamber.

Inside the chamber is a stack 4 of membrane and frame members bounded by two end plates 7 and 8. The stack is clamped between the base plate 1 and a rigid plate 37 by means of a series of threaded rods 9 and nuts 11 and washers 10, and is positioned by two centring rods 5 and 6 firmly fixed to the base plate.

Figure 2:
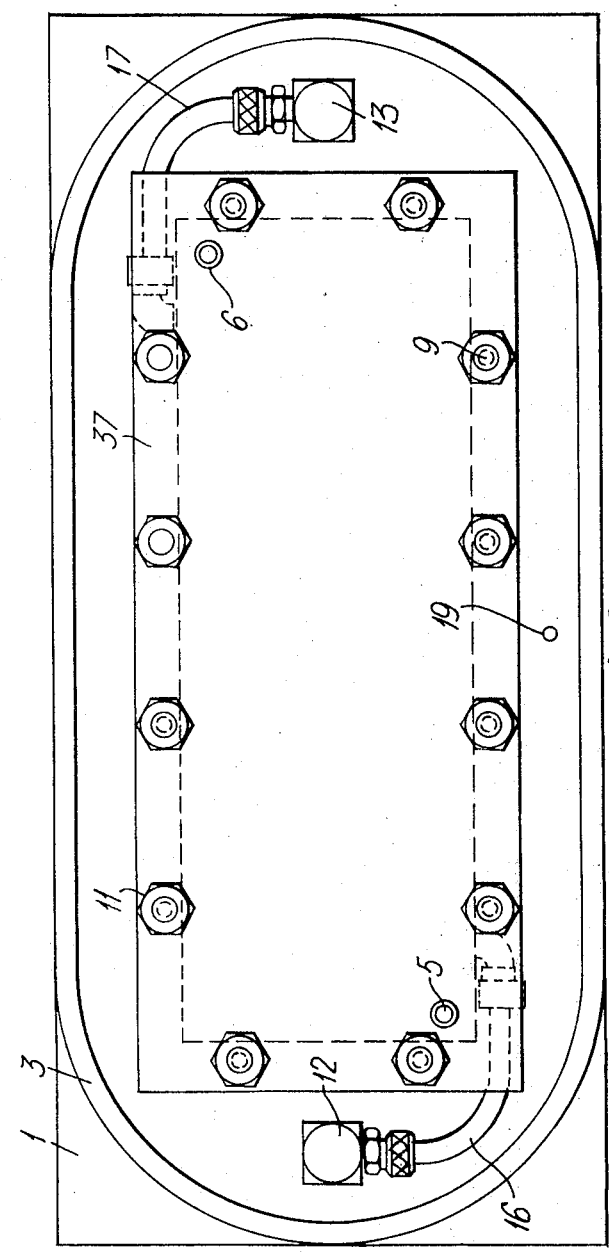
FIG. 2 is a plan view of the apparatus represented in FIG. 1.

Two headers 12 and 13 for the supply of the fluid to be treated and the withdrawal of the treated fluid respectively, are located on either side of the stack 4, pass through the base plate 1 and open, on the outside, into the supply and withdrawal pipelines 14 and 15. The header 12 is connected by the tube 16 to a duct 33 inside the plate 7 and the header 13 is connected by a tube 17 to a duct 34 inside the plate 8. (The ducts 33 and 34, which are not shown in FIGS. 1 and 2, are shown in FIG. 7). Furthermore, a pipe 19 connects the inside of the chamber with the outside and thus makes it possible to remove the fluid which has passed through the membranes, this fluid being called the permeate.

Figure 4:
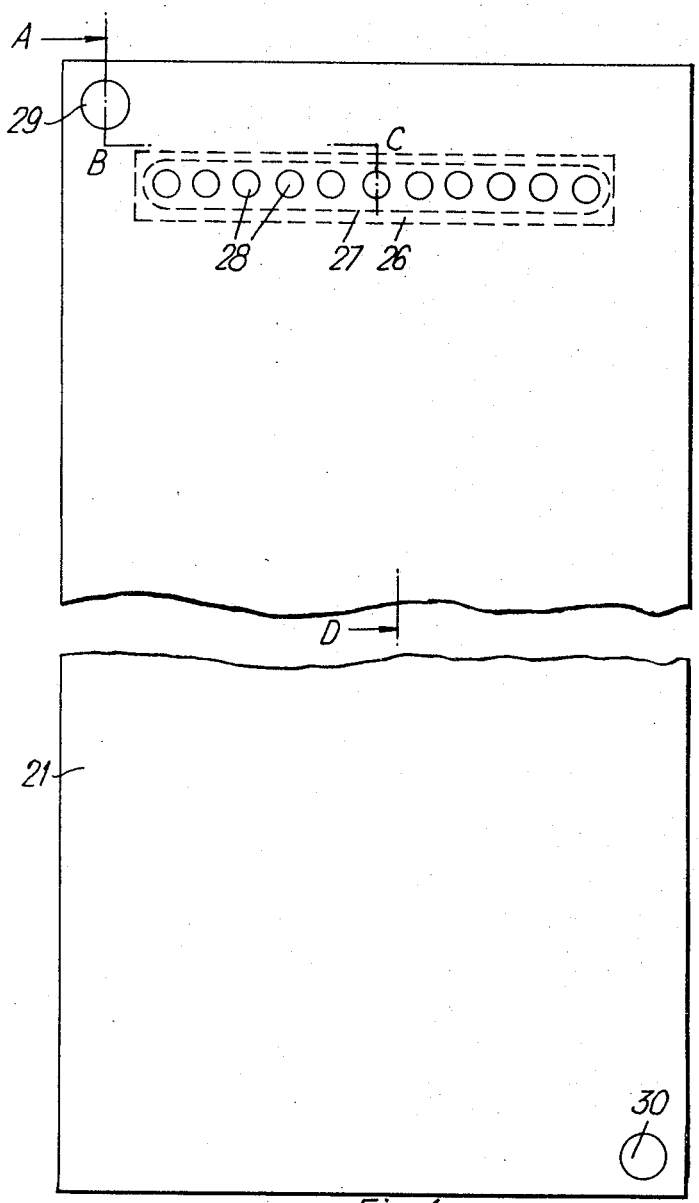
FIG. 4 is the plan view of a membrane member used in the apparatus of the invention.
Figure 5:
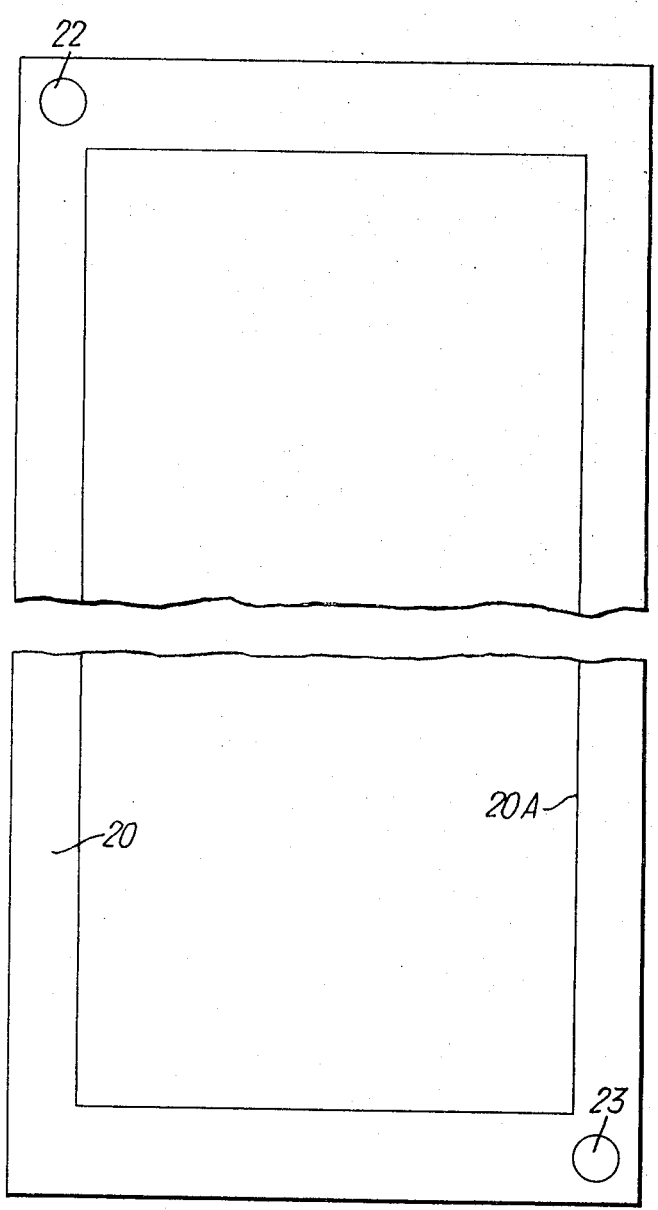
FIG. 5 is an end elevation of a frame member.
Figure 6:
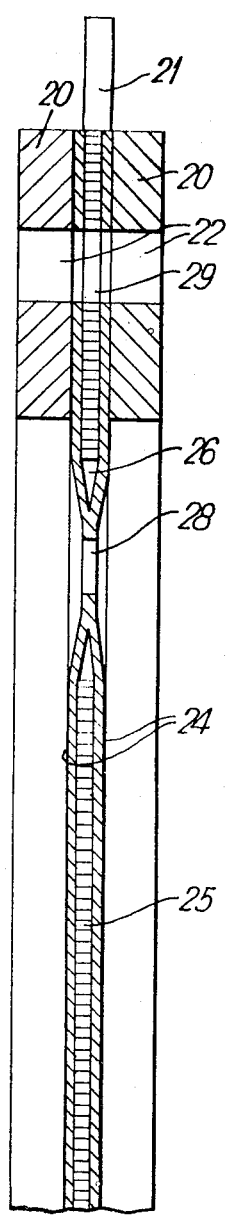
FIG. 6 is the partial view in cross-section taken along the line A–B–C–D of FIG. 4.

The stack 4 is formed by alternately superposing frame members 20 which surround a central cell forming aperture 20A represented in FIG. 5, and membrane members 21, shown in FIG. 4. The frame members 20 and the membrane members 21 are plane and have an outer parallelepipedonal shape, preferably rectangular, profile, which makes it possible to use membranes with practically no waste from continuous strips. They are preferably equipped with diagonally opposite slots 22, 23 and 29, 30, which make it possible to position them on the centring rods 5 and 6. FIG. 6 shows the relative arrangement of a membrane member 21 between two frame members 20.

Each membrane member 21 (see FIGS. 4 and 6) comprises two permeable membranes 24 located on either side of a porous support 25, which is generally flexible, and in which at least one hollow or opening 26 is formed in the vicinity of one end. It is possible to form several openings, located transversely. It is preferred to form only one of them, with an elongated shape, located transversely relative to the support. The total length of the opening or openings is generally between 40 and 90 percent and preferably between 50 and 80 percent, of the width of the support. The two membranes 24 are joined together in a fluidtight manner, for example by gluing or heat-sealing, inside each opening (this zone is represented in FIG. 4 by the broken line 27). Of course, the two joined membranes can be replaced by a single membrane which is folded back on itself. In the zone 27 where they are joined together in a fluidtight manner, they have one or more orifices 28.

Figure 9:
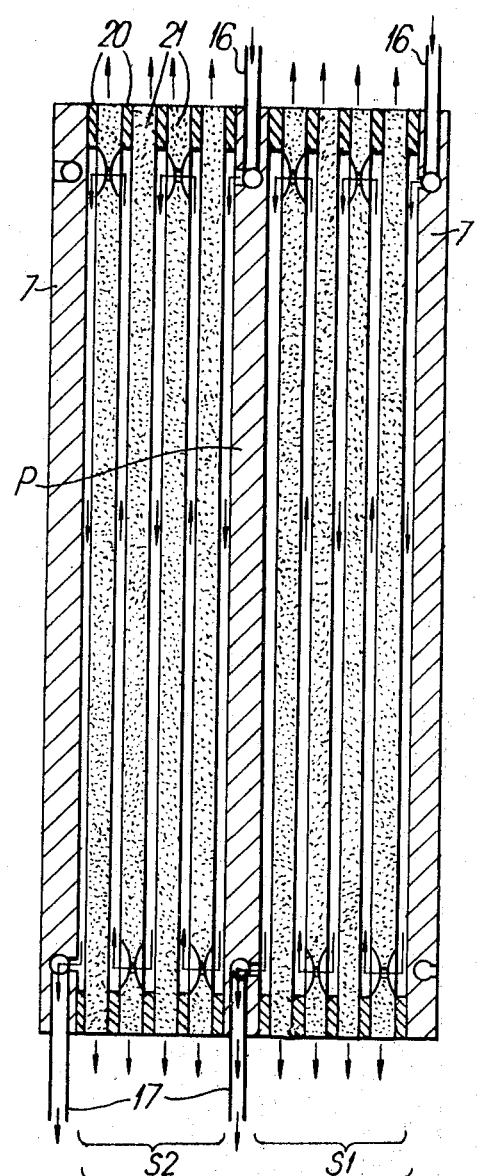
FIG. 9 is the cross-sectional view of two sub-assemblies showing the flow of the fluids.

The membrane members 21 are arranged head-to-tail when the stack is being formed, as represented in FIG. 9.

The end plates 7 and 8 (see FIGS. 7 and 8) are generally parallelepipedonal in shape and their dimensions are similar to those of the membrane elements 21. Two diagonally opposite holes 31 and 32 permit them to be positioned on the centring bars 5 and 6. Two side ducts 33 and 34, which are symmetrical relative to the centre of the plate, are situated in the thickness of the plate, at each end of the latter. These channels each open on an opposite face of the plate through transverse elongated ports 35 and 36. The position of these ports is chosen to coincide with the zone of the orifices 28 of the membrane members.

The stack 4 represented in FIG. 9, consists of two sub-assemblies $S_1$ and $S_2$, each containing several membrane membes 21. The two sub-assemblies are separated by an intermediate plate P which is identical to the end plates 7 and 8.

The sub-assemblies $S_1$ and $S_2$ are connected to a supply header 12 by tubes 16 connected in parallel and to a withdrawal header 13 by tubes 17 which are also connected in parallel.

The permeate fluid escapes from the stack at the periphery of the membrane members, as shown by the arrows represented in FIG. 9.

Figure 3:
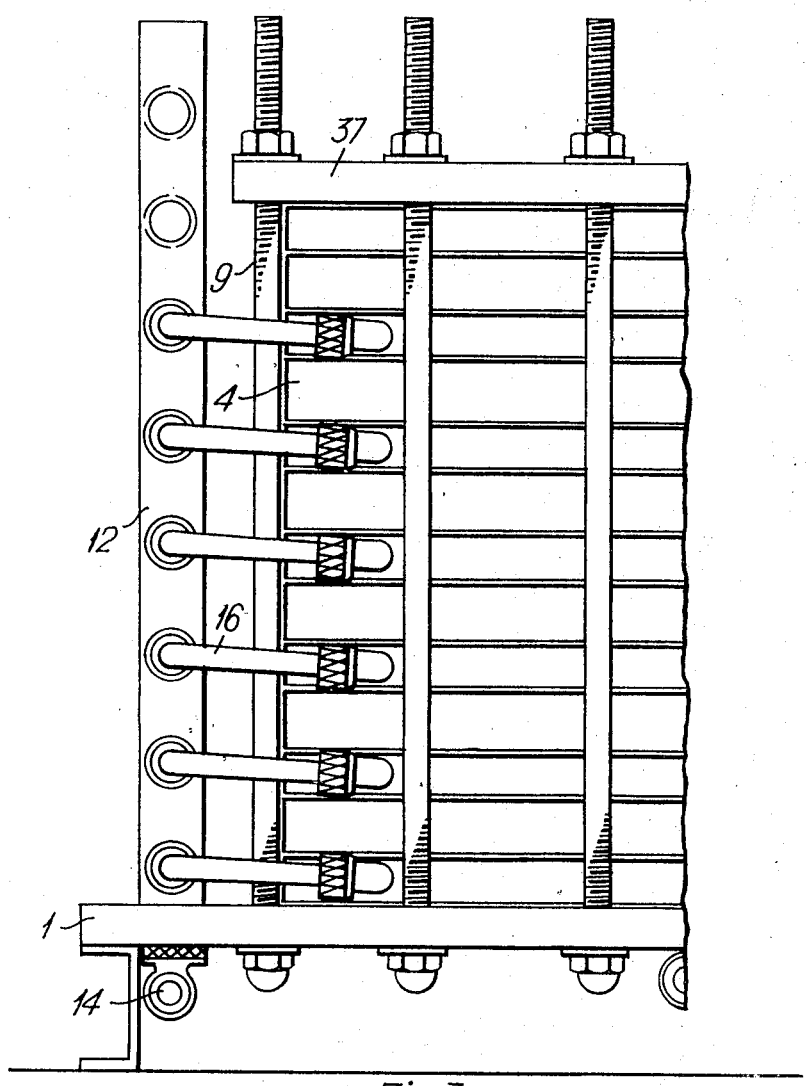
FIG. 3 is a scrap side elevation of a modified embodiment of the apparatus, the casing being assumed to have been removed.

FIG. 3 shows a partial view of the appearance of such a stack. Thus the fluid to be treated can flow inside a sub-assembly, in series from one membrane member 21 to another and in parallel between each sub-assembly. This achieves great flexibility in use and makes it possible, if necessary, to locate and isolate a sub-assembly in which a leak might appear.

The apparatus according to the invention can be constructed from very diverse materials, according to the usual rules for constructing equipment; the casing, the base and the clamping plates can, for example, be of metal such as aluminum or of thermoplastic materials such as polyvinyl chloride of polyvinyl acetyl-chloride or methyl methacrylate. The material forming the porous support of a membrane element is preferably a non-woven fabric, which may be either natural, for example, in the form of filter paper or felt, or synthetic, in the form of a sintered polyethylene, or non-woven fabric made from fibres of polyester or nylon. The membranes are of the types usually employed in gas permeation, such as polyvinyl chloride or polyvinyl acetate, polybutadiene, polystyrene, vinyltrialkyl-silane polymer and the like. Membranes produced from a vinyl-triorganosilane polymer, according to Belgian Pat. No. 763,749, are preferably used, because they have the advantages of being heat-sealable.

Figure 10:
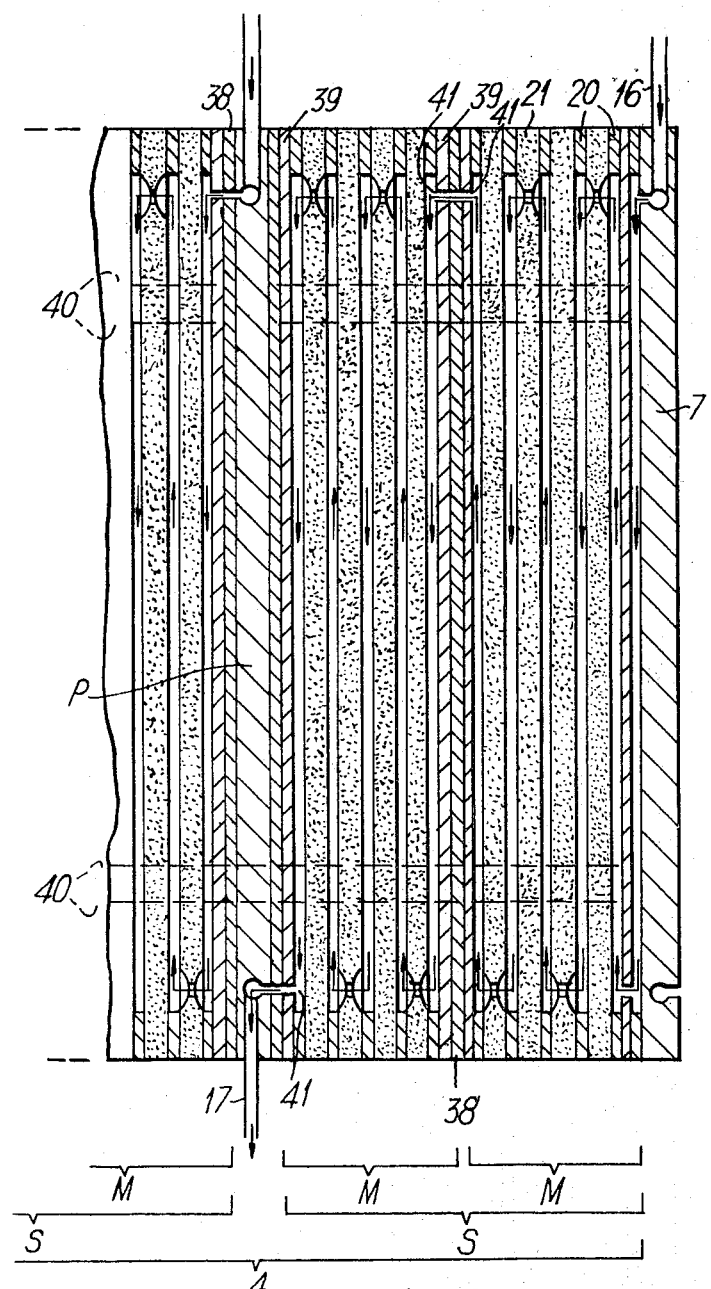
FIG. 10 is a similar view showing an assembly of elements grouped inside the sub-assemblies.

The apparatus according to the invention can be modified in various ways, within the scope of the technician. Thus, several membrane members 21 can advantageously be grouped together between two rigid plates 39 formed with an aperture 41 which is opposite the orifices 28 and they can be connected together, for example, by adhesive tapes 40, as represented in FIG. 10. A complete frame 38 provided with an aperture corresponding to the apertures 41 is placed between the plates 39 and P. This arrangement facilitates handling, storing and testing for fluidtightness. By way of example, FIG. 10 represents groups M of membrane members connected in series, in pairs, inside sub-assemblies S, supplied in parallel.

The apparatus according to the invention can be used for gas permeation operations, for example, for enriching air with oxygen, for recovering hydrogen contained in purges, for separating hydrogen and methane in cracking gases, for purifying air polluted with carbon monoxide, for recovering helium mixed with air in recording balloons and dirigible balloons, for isolating helium for natural gas and the like.

The apparatus according to the invention is also suitable for pervaporation, this being a treatment which consists of passing, in the form of vapour, through a membrane, at least one constituent of a liquid phase, the latter being heated to a temperature below its boiling point at the pressure to which it is subjected.

The apparatus according to the invention offers many advantages because it is made from flat elements contained in a chamber which is only closed by a casing. It can be dismantled easily and its various elements can be changed easily.

When the stack is arranged in sub-assemblies it is possible easily to detect an element which might be defective. By using a sealed chamber it is possible easily to evacuate the whole of the circuit of the permeate. The grouping of the membranes in membrane members makes it possible to have a large membrane surface area with a reduced overall size, and makes it possible to handle the membranes easily.

The following examples show the excellent results obtained in gas permeation with an apparatus equipped with particular membranes.

EXAMPLE 1

The apparatus represented in FIG. 1 is used to obtain a permeate which is enriched in oxygen from atmospheric air.

This apparatus comprises 16 superposed membrane members 21 which are connected in series inside a fluid tight chamber. Each membrane member consists of two membranes 24 of polyvinyltrimethylsilane, on either side of a filter paper of thickness 0.12 mm, the membranes being heat-sealed at 140°C inside the opening 26. The total thickness of the membrane member is about 200 microns and the thickness of the selective layer of the membrane is 1 micron. The porous layer of the membrane is located against the filter paper. The rectangular membranes, of 115 × 205 mm, are perforated with four aligned holes 28 of diameter 4 mm, in a rectangular heat-sealed zone of 8 × 68 mm. The usable surface area of each membrane is 1 $dm^2$. The frame members 20 of thickness 1 mm, are made of rubber of 40 Shore hardness.

A series of measurements is made at a temperature of 24°C, the treated air being supplied under increasing absolute pressures p and the permeate is removed under a constant pressure of 745 mm of mercury.

The results obtained are given in the table below, the flow rates being expressed in litres/hour, converted to normal conditions of temperature and pressure (0°C, 760 mm Hg). The abbreviations used have the following meaning:

R: rate of supply of air (containing 21 percent of oxygen)
E: rate of escape (of the gas mixture which did not pass through the membranes)
X: percentage of oxygen in E
F: flow rate of the permeated fluid (gas mixture which did pass through the membranes)
Y: percentage of oxygen in F.

| P | R | E | X | F | Y |
|---|---|---|---|---|---|
| 6 bars | 980 | 930 | 20.4 | 47 | 36.5 |
| 8 bars | 925 | 870 | 20.3 | 53 | 36.5 |
| 8.9 bars | 1050 | 1000 | 20.1 | 48 | 36 |
| 11 bars | 1060 | 1000 | | 60 | 38 |

The very great enrichment of oxygen in the permeate will be noted.

EXAMPLE 2

The same apparatus as in Example 1 is used, but the number of membrane members is reduced to 15 and the thickness of the frame members is 0.7 mm (Shore hardness 60).

A series of measurements is made at a temperature of 24°C, the treated air being supplied under a constant absolute pressure P at varying flow rates and the permeate being removed at an absolute pressure of 0.1 bar. The results obtained are given in the table below, in which the same abbreviations as above are used:

| P | R | E | X | F | Y |
|---|---|---|---|---|---|
| 3.65 bars | 990 | 940 | 20.1 | 50 | 36.5 |
| 3.65 bars | 215 | 163 | 16.8 | 52 | 33.5 |
| 3.65 bars | 73 | 23 | 7.8 | 49 | 27.0 |

It will be noted that the enrichment of oxygen in the permeate is better the lower is the pressure at which the permeate is withdrawn.

We claim:

1. Separating apparatus particularly suitable for gas permeation and pervaporation, said apparatus comprising, in combination:
   a. a plurality of parallelepipedonal frame members having a certain width and defining a central cell forming aperture;
   b. a plurality of parallelepipedonal membrane members, stacked alternately with said frame members and having substantially the same width to form a stack, said membrane members each including:
      aa. two permeable membranes,
      bb. a porous support interposed between said permeable membranes,
      cc. means defining at least one opening in said porous support, near one side thereof, said means extending across between 40 and 90% of the width of the support, said two membranes being secured to one another, in a fluidtight manner over a zone within said opening, the openings of alternate membrane members being at opposite sides of the stack;
      dd. means defining at least one orifice through the membranes in said zone;
   c. means for supplying a fluid to one end of the stack;
   d. means for withdrawing the fluid from the other end of the stack;
   e. a fluidtight chamber enclosing said stack; and
   f. means for removing permeate fluid from said chamber.

2. Separating apparatus as claimed in claim 1, and further comprising a header connected to said supply means, a header connected to said withdrawing means and at least one intermediate plate dividing the membranes and frames into sub-assemblies, said at least one intermediate plate having two ports each connected to a different one of said headers, the ports of an intermediate plate communicating with said orifices of the adjacent membrane member effective to connect the sub-assemblies in parallel.

3. Separating apparatus as claimed in claim 1, and further comprising two rigid end plates arranged one at each end of the stack and a port formed in said end plates, one connected to said supply means and the other to said withdrawing means, the ports of the end plates communicating with said orifices of the adjacent membrane member.

4. Separating apparatus as claimed in claim 1, wherein said chamber comprises a base plate on which said stack is mounted and a transparent cover secured in fluidtight manner to said base plate.

5. Separating apparatus as claimed in claim 1, wherein at least one of the membrane members includes anisotropic vinyltriorganosilane polymer membranes heat-sealed together within said openings.

* * * * *